United States Patent [19]
Glover

[11] 3,731,709
[45] May 8, 1973

[54] LIQUID PULSATION DAMPENER

[75] Inventor: Robert C. Glover, Santa Paula, Calif.

[73] Assignee: Fluid Kinetics Corporation, Ventura, Calif.

[22] Filed: June 1, 1971

[21] Appl. No.: 148,361

[52] U.S. Cl. ..................... 138/37, 181/47 B, 181/58
[51] Int. Cl. ................................................. F15d 1/06
[58] Field of Search ........................... 417/540–543; 138/30, 26, 37, 39, 40; 181/58, 47 B

[56] References Cited

UNITED STATES PATENTS

| 2,146,183 | 2/1939 | Hector | 181/58 UX |
| 2,511,597 | 6/1950 | Marx | 181/58 |
| 3,036,656 | 5/1962 | Angelery | 181/58 |
| 3,137,316 | 6/1964 | Everett et al. | 138/26 |

FOREIGN PATENTS OR APPLICATIONS

| 448,544 | 6/1936 | Great Britain | 181/58 |
| 463,466 | 3/1937 | Great Britain | 181/58 |

Primary Examiner—Henry T. Klinksiek
Attorney—Nilsson, Robbins, Wills & Berliner

[57] ABSTRACT

A dampener is disclosed for use in a pipeline, to reduce noise, vibration and peak pressures. A housing receives intake and outlet manifold structures which impart an orbital spin flow pattern to the liquid causing it to move in a circle about the axis of the major flow pattern. The manifolds as disclosed are somewhat flat members defining radially-extending peripheral shoulders which are ported to communicate with radially-extending passages through which fluid is communicated into and out of the orbital flow pattern. As disclosed herein, the housing is spherical with axially-aligned inlet and outlet ducts, and nozzles are provided in the ports of the inlet manifold.

5 Claims, 5 Drawing Figures

Patented May 8, 1973
3,731,709
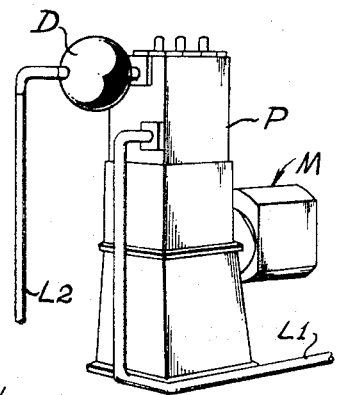
Fig.1.
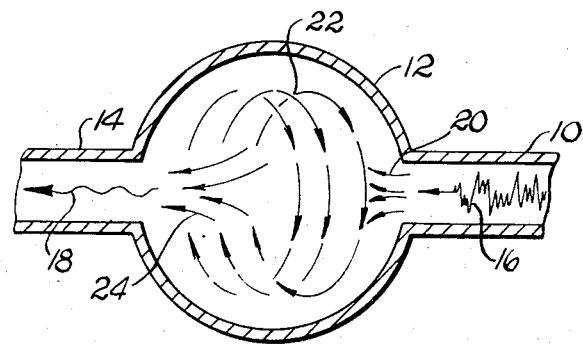
Fig.2.
Fig.3.
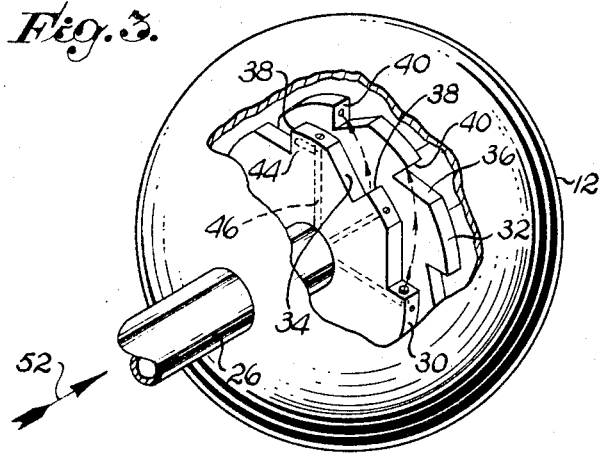
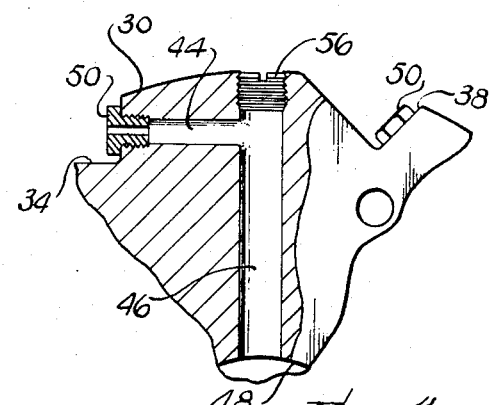
Fig.4.
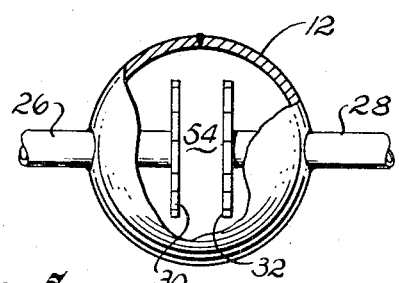
Fig.5.
INVENTOR.
ROBERT C. GLOVER
BY
NILSSON ROBBINS WILLS & BERLINER
ATTORNEYS

LIQUID PULSATION DAMPENER

BACKGROUND AND SUMMARY OF THE INVENTION

The need has been known to exist for some time for liquid dampeners, as for use in certain types of pipelines. For example, pipelines incorporating certain forms of pumps are subjected to deleterious pulsating energy which effectively reduces the life of various components of the system, including valves and meters. The pulsating energy may also appear in the form of vibration which imposes increased demands on support structures in the pipeline system. Also, such pulsating energy may result in peak pressures to require higher pressure standards for the system, generally resulting in increased costs. Finally, pulsating energy and vibration in pipelines also may develop noise-related problems. These, and other problems have resulted in efforts to provide effective liquid dampeners for use in pipelines. Specifically, for example, prior forms of such dampeners are disclosed in U.S. Pat. Nos.: 2,100,404 (Fluid Transmission); 2,185,023 (Vibration Damper); and 2,727,470 (Pulsation Dampener).

Although prior forms of liquid-dampening devices have been effective, certain disadvantages generally have been attendant their use. Specifically, for example, some forms of prior dampeners have incorporated moving parts, parts which deteriorate with use, or gas charges, thereby requiring some relatively-substantial maintenance. Also, some prior dampeners have been frequency sensitive, requiring tuning for a particular installation, or the selection of a specific unit for a particular installation. Some forms of prior dampeners also have incorporated elements which imposed temperature limitations thereby limiting their use. Within these considerations, a substantial need exists for an improved liquid dampener having relatively small space requirements, imposing a relatively small pressure drop and having effective performance; which unit can be simply and conveniently installed in new or existing systems.

Generally, the present invention comprises a relatively-simple hydraulic structure wherein a fluid stream is diverted in a confined space to flow somewhat transversely, as in an orbit about the major axis of flow. The orbital flow results in a spinning mass which may be analogized to a mechanical fly wheel in an action to absorb energy impulses, with attendant dampening of the liquid, to accomplish the objectives as suggested above.

BRIEF DESCRIPTION OF THE DRAWINGS

In the drawings which constitute a part of this specification, an exemplary embodiment demonstrating various objectives and features hereof is set forth, as follows:

FIG. 1 is a perspective view of a pumping station of a pipeline system, incorporating a dampener in accordance with the present invention;

FIG. 2 is a diagrammatic view illustrating the operation of the dampener hereof;

FIG. 3 is a sectionalized view of a liquid dampener as depicted in FIG. 1;

FIG. 4 is a fragmentary sectionalized view of an element of the apparatus as shown in FIG. 3; and FIG. 5 is a vertical sectionalized view taken centrally through the apparatus of FIG. 3.

DESCRIPTION OF THE ILLUSTRATIVE EMBODIMENT

As required, a detailed illustrative embodiment of the invention is disclosed herein. The embodiment, however, merely exemplifies the invention which may, of course, be constructed in various other forms, some of which may be different from that disclosed herein. However, specific structural and functional details disclosed herein are representative and in that regard provide a basis for the claims hereof.

Referring initially to FIG. 1, a pumping station (flow left to right) is represented incorporating a drive motor M for actuating a pump P to force liquid, e.g., petroleum, from an intake line L1 through a dampener D to an outlet line L2. Generally, as a result of the reciprocating operation of the pump P, pulsating forces are developed, primarily in the line L2, which as indicated above can be troublesome and expensive. Functionally, as described in detail below, the pulsation dampener D reduces such pulsating or transient energy in the line L2 thereby avoiding the difficulties and expense.

The dampener D is represented somewhat symbolically in FIG. 2 to include an intake duct 10 (flow left to right) to a housing 12 from which liquid exists through an outlet duct 14. As represented by the hydraulic waveform 16, liquid received through the intake duct 10 is subjected to substantial pulsating pressure variations. However, after passing through the structure hereof (described in detail below) the liquid exists through the outlet duct 14 and is subjected to substantially reduced pulsating energy as indicated by the hydraulic waveform 18.

The detailed operation and structure of a disclosed embodiment is explained below; however, preliminarily, it may be helpful to understand that the liquid in passing through the housing 12 (pattern lines 20) moves into an orbital-flow or spin pattern as indicated by the flow lines 22. Liquid is drawn from the orbital pattern, as indicated by the lines 24, to exit through the outlet duct 14. As suggested above, the spinning mass as indicated by the lines 22, may be analogized to a mechanical flywheel structure and accomplishes a similar dampening function. Specifically, the orbital flow pattern tends to absorb cyclical pulsation impulses as produced by the pump P (FIG. 1) and stabilizes the flow. Substantial reductions have been accomplished between peak-to-peak levels by the installation of embodiments hereof, to the substantial benefit of the pump, as well as the downstream line structure as explained above.

Considering the internal structure of the dampener, reference will initially be made to FIGS. 3 and 5. The spherical housing 12 defines a pair of diametrically-opposed, axially-aligned bores for receiving an intake pipe 26 and and outlet pipe 28. Inside the housing 12 the pipes 26 and 28 are terminated at distributors or manifolds 30 and 32, respectively, which accomplish the orbital or spin-flow pattern attendant the operation of the dampener. Manifolds 30 and 32 are somewhat similar structurally and comprise circular plates formed with peripheral steps 34 and 36, respectively, to define opposed radially-extending shoulders 38 and 40. Each of the shoulders 38 and 40 incorporates an orifice or entry port into a short bore or section 44 (FIG. 4) extending transversely to the axis of the somewhat-circular manifolds. The sections 44 communicate with radial passages 46 which in turn communicate with the central manifold section 48.

In general, the aggregate cross-sectional area provided by the radial passages 46 in each of the manifolds 30 and 32 is somewhat reduced from the cross-sectional area of the pipes 26 or 28. Accordingly, liquid flow through the manifolds is accelerated. Furthermore, the manifold 30 incorporates nozzle bushings 50 (FIG. 4).

In the operation of the dampener as disclosed herein, liquid entering the pipe 26, as indicated by an arrow 52 (FIG. 3) is divided into a number of radial streams in the passages 46, which streams flow at increased velocity. The streams in the passages 46 are turned at the radial ends of the passages to flow through sections 44 (FIG. 4) and pass through the nozzle bushings 50. The transverse streams flowing from the several nozzle bushings 50 result in the orbital or spinning flow pattern as described with reference to FIG. 2. The fluid (liquid) is then tapped from the orbital flow pattern by passing through the ports at shoulders 40 of the manifold 32. The flow pattern through the manifold 32 is inverse to that previously described for the manifold 30 with the individual passages 46 (manifold 32, not shown) receiving liquid in individual streams which merge at the pipe 28 and, accordingly, exit from the housing 12.

The rigid interconnection of the individual components in the structure disclosed is to be emphasized along with the fact that the rotary spin flow is accomplished entirely hydraulically. The spin flow pattern is believed to effectively dampen vibrations by reason of a number of considerations. Specifically, the flow pattern breaks up any standing wave resonance which might otherwise be developed between the pump and the downstream piping, due to the orbital or transverse nature of the flow pattern. Furthermore, while gas is compressible, liquid is slightly compressible and, accordingly, a liquid volume as provided in the orbital flow pattern, provides some of the "spring" effect of a gas volume, thereby obtaining a dampening effect. Still further, the orbital or spin flow pattern appears to develop a vapor chamber at the center axis of spin. Specifically, the axial space 54 (FIG. 5) between the manifolds 30 and 32 may tend to contain a small vapor pocket, which affords a cushion for pressure pulsations thereby further dampening such energy.

Considering the manufacture of the structure herein, a variety of techniques may be employed. However, the described embodiment may be produced by forming the housing 12 as a pair of separate hemispheres. The manifolds may also be independently formed by machining passages 46 and sections 48 therein, after cutting the steps 34 and 36 as from a pair of circular steel plates. Subsequently, the external ends of the passages 46 may be threaded to receive plugs 56 for closing these passages. Similarly, the termination of sections 44 in the manifold 30 may also be threaded to receive the bushings 50.

Next, the pipes 26 and 28 are affixed into the manifolds 30 and 32, respectively, in communication with the radially extending passages 46. This connection may be accomplished by welding or other techniques. Similarly, the pipes 26 and 28 may be affixed in the hemispheres defining the housing 12 as by welding. Finally, the two hemispherical subassemblies may be joined by welding the hemispheres together to complete the housing 12. Thus, the system as disclosed herein as an illustrative embodiment is completed and may be easily coupled into an existing pipeline or may be easily incorporated during initial construction of a pipeline.

As indicated above, a specific embodiment has been disclosed herein in detail; however, it is to be emphasized that a wide variety of structures will be readily apparent to one skilled in the art for accomplishing the orbital or spin flow pattern, which is characteristic of a dampener of the present invention. Consequently, the scope hereof is to be defined in accordance with the claims as set forth below.

What is claimed is:

1. A liquid pulsation dampener, as for use in a liquid stream, comprising:
    a housing means defining an internal cavity as a figure of rotation about a central axis;
    a first manifold member affixed in said housing, adapted to receive said liquid stream, said first manifold member defining a central intake duct connected to a plurality of first passages extending radially to the axis of said figure of rotation and terminating at first sections extending substantially tangentially to said figure of rotation to communicate with said internal cavity;
    and a second manifold member affixed in said housing in opposed relationship to said first manifold member, said second manifold member defining a central exhaust duct connected to a plurality of second passage extending radially to the axis of said figure of rotation and terminating at second sections extending substantially tangentially to said figure of rotation to communicate with said internal cavity, said exhaust duct extending out of said housing substantially aligned with said central intake duct at the axis of said figure of rotation.

2. A liquid pulsation dampener according to claim 1 further including nozzle means affixed in said plurality of first sections.

3. A liquid pulsation damper according to claim 1, wherein the total cross-sectional area of said radial first passages defined in said first manifold member is smaller than the cross-sectional area defined in said intake duct.

4. A liquid pulsation damper according to claim 1, wherein said manifolds each comprise a somewhat flat structure, defining a plurality of radially extending shoulders wherein ports are defined into said sections.

5. A liquid pulsation damper according to claim 4, wherein said housing means comprises a sphere.

* * * * *